UNITED STATES PATENT OFFICE.

GUSTAVE PERTSCH, OF LYONS, FRANCE, ASSIGNOR TO LA SOCIÉTÉ CHIMIQUE DES USINES DU RHÔNE, ANCIENNEMENT GILLIARD, P. MONNET ET CARTIER, OF SAME PLACE.

LOCAL ANESTHETIC.

SPECIFICATION forming part of Letters Patent No. 628,489, dated July 11, 1899.

Application filed May 28, 1897. Serial No. 638,643. (No specimens.)

*To all whom it may concern:*

Be it known that I, GUSTAVE PERTSCH, managing director of La Société Chimique des Usines du Rhône, anciennement Gilliard, P. Monnet et Cartier, of Lyons, France, manufacturers, a citizen of the French Republic, and a resident of Lyons, France, have invented certain new and useful Improvements in Preparations for Producing Local Anesthesia, of which the following is a specification.

For several years past readily-volatilizable liquids, such as ethyl chloride, have been employed to produce local anesthesia by applying them in a fine jet or spray to the part affected or to be treated. Anesthesia is produced by the generation of cold due to the rapid evaporation of the liquid, but the effect lasts for only a very short time.

I have discovered by repeated experiment that the duration of the effect can be considerably lengthened by dissolving suitable slowly-acting substances, such as cocaine, in a readily-volatilizable liquid, such as ethyl chloride, the boiling-point of which is at a temperature below the ordinary temperature of the hand, and applying the combined medicaments to the part required.

My invention therefore consists, primarily, of preparations for producing local anesthesia, such preparations consisting of suitable slowly-acting substances dissolved in suitable readily-volatilizable liquids, the boiling-point of which is at a temperature below the ordinary temperature of the hand.

For example, from one to two per cent. of cocaine dissolved in ethyl chloride produces anesthesia of considerable duration. When cocaine is applied subcutaneously in the ordinary way, its action does not take effect until after five or six minutes, and with some persons it causes unpleasant and even toxic by-effects; but when applied externally, dissolved in ethyl chloride according to this invention, the effect is instantaneous, and when the action of the ethyl chloride ceases that of the cocaine continues. I believe that the dissolved cocaine penetrates into the dermis or true skin, as this is the only way I can explain the real and continued anesthesia produced. I have never observed any toxic by-effects.

It is very important that the solutions which I claim can be used in receptacles of glass or metal of a practical size and with capillary outlets, so that if these receptacles are taken in the hand and the outlets opened they eject automatically, by the internal pressure occasioned by the heat of the hand, a regular spray of the liquid contained therein. It is very important that this spray is obtained quite automatically without any trouble on the part of the operator, because in the surgical operations during which these solutions are used only one hand is at liberty for such purposes.

My invention, by using ethyl chloride or its equivalent as a solvent, provides a solution the boiling-point of which is sufficiently low to insure sufficient volatilization from the temperature of the hand or of the ordinary atmosphere for generating a suitable pressure for expelling the solution in a jet from a suitable vessel.

Instead of cocaine, other substances having a similar effect may be employed, such as eucaine, &c., which may be brought into solution by addition of alcohol.

Other suitable liquids having a suitably low boiling-point may be employed as equivalents of chloride of ethyl—as, for example, chloride of methyl.

Instead of ethyl chloride, mixtures of the same with methyl chloride or other liquids of correspondingly low boiling-point may be employed.

What I claim, and desire to secure by Letters Patent, is—

1. As a new product for producing local anesthesia, a non-volatile substance capable of producing local anesthesia, dissolved in a liquid the boiling-point of which is at a temperature below 30° centigrade.

2. As a new product for producing local anesthesia, cocaine dissolved in a liquid the boiling-point of which is at a temperature below 30° centigrade.

3. As a new product for producing local anesthesia, cocaine dissolved in ethyl chloride.

In witness whereof I have hereunto signed my name in the presence of two subscribing witnesses.

GUSTAVE PERTSCH.

Witnesses:
LOUIS ROUSER,
RUDOLPHE PFISTER.